US012743520B2

(12) United States Patent
Stöttinger et al.

(10) Patent No.: US 12,743,520 B2
(45) Date of Patent: Sep. 22, 2026

(54) METHOD FOR DETECTING ANOMALIES SUGGESTING A MANIPULATION DURING A SECURE STARTING OPERATION OF A SOFTWARE-CONTROLLED DEVICE

(71) Applicant: Continental Automotive Technologies GmbH, Hannover (DE)

(72) Inventors: Marc Sebastian Patric Stöttinger, Oestrich-Winkel (DE); Steffen Sanwald, Darmstadt (DE)

(73) Assignee: AUMOVIO Germany GmbH, Frankfurt am Main (DE)

( * ) Notice: Subject to any disclaimer, the term of this patent is extended or adjusted under 35 U.S.C. 154(b) by 0 days.

(21) Appl. No.: 18/711,181

(22) PCT Filed: Nov. 15, 2022

(86) PCT No.: PCT/DE2022/200269
§ 371 (c)(1),
(2) Date: May 17, 2024

(87) PCT Pub. No.: WO2023/088523
PCT Pub. Date: May 25, 2023

(65) Prior Publication Data

US 2025/0013752 A1 Jan. 9, 2025

(30) Foreign Application Priority Data

Nov. 18, 2021 (DE) ..................... 10 2021 212 994.3

(51) Int. Cl.
*G06F 21/57* (2013.01)
*G06F 21/56* (2013.01)

(52) U.S. Cl.
CPC .......... *G06F 21/575* (2013.01); *G06F 21/566* (2013.01); *G06F 2221/034* (2013.01)

(58) Field of Classification Search
CPC ..... G06F 21/575; G06F 21/566; H04L 9/3234
See application file for complete search history.

(56) References Cited

U.S. PATENT DOCUMENTS 9,165,143 B1 10/2015 Sanders
9,740,863 B2 8/2017 Sherman
(Continued)

FOREIGN PATENT DOCUMENTS

DE 102009000874 A1 8/2010
DE 102019008059 A1 6/2020
(Continued)

OTHER PUBLICATIONS

Search dated Mar. 31, 2025 from corresponding Japanese patent application No. 2024-529707.
(Continued)

*Primary Examiner* — Pramila Parthasarathy

(57) ABSTRACT

A method for recognizing anomalies suggesting a manipulation during a secure booting operation of a software-controlled device comprises, inter alia, checking operating parameters of system components necessary for the operation of a microprocessor, checking a flag indicating an improperly concluded booting operation, and signature-based authenticity checking of software to be loaded or software components to be loaded. In the case of multistage booting operations, counter values assigned to a respective stage are compared with associated reference values. In the event of a fault, each check can output a signal on the basis of which, optionally together with further signals, the type of an attack can be recognized, so that specific countermeasures can be initiated.

14 Claims, 2 Drawing Sheets

(56) References Cited

U.S. PATENT DOCUMENTS

| | | | | |
|---|---|---|---|---|
| 9,773,115 | B2 * | 9/2017 | Jacobs | G06F 21/575 |
| 11,487,872 | B2 * | 11/2022 | McDonough | G06F 21/75 |
| 2012/0210115 | A1 * | 8/2012 | Park | H04L 9/3247 713/2 |
| 2014/0215196 | A1 * | 7/2014 | Berlin | G06F 21/575 713/2 |
| 2016/0357963 | A1 | 12/2016 | Sherman | |
| 2020/0193028 | A1 | 6/2020 | Norem et al. | |

FOREIGN PATENT DOCUMENTS

| | | | |
|---|---|---|---|
| DE | 102019127856 | A1 | 4/2021 |
| JP | 2004206683 | A | 7/2004 |
| JP | 2018503157 | A | 2/2018 |
| JP | 2020091698 | A | 6/2020 |
| JP | 2021505097 | A | 2/2021 |
| WO | 2020209714 | A1 | 10/2020 |
| WO | 2020251542 | A1 | 12/2020 |

OTHER PUBLICATIONS

Notice of Reasons for Refusal dispatched on Apr. 1, 2025 from corresponding Japanese patent application No. 2024-529707.

Decision to Grant issued on May 27, 2025 from corresponding Japanese patent application No. 2024-529707.

German Office Action dated Oct. 22, 2022 for the priority German Patent Application No. 10 2021 212 994.3 and machine translation of same.

The International Search Report and the Written Opinion of the International Searching Authority mailed on Feb. 7, 2023 for the PCT Application No. PCT/DE2022/200269 which this application claims priority.

German Notice of Allowance dated Nov. 1, 1023 for the priority German Patent Application No. 10 2021 212 994.3 and machine translation of same.

Niek Timmers et al., “Bypassing Secure Boot using Fault Injection”, Black Hat Europe 2016, Nov. 4, 2016.

Job De Haas, “20 ways past secure boot”, Riscure, 2013.

* cited by examiner

METHOD FOR DETECTING ANOMALIES SUGGESTING A MANIPULATION DURING A SECURE STARTING OPERATION OF A SOFTWARE-CONTROLLED DEVICE

TECHNICAL FIELD

The present invention relates to a method for recognizing or identifying anomalies during a secure booting operation of a software-controlled device, such as occur e.g. in the event of manipulation attempts.

BACKGROUND

A plethora of modern devices are controlled by software which, when the respective device is started up, is read from a storage medium and transferred to a main memory, where it is ultimately executed by a processor.

Since the software available is generally not monolithic and can be executed directly in the nonvolatile memory, e.g. flash memory, the individual components for execution have to be loaded from the nonvolatile memory into the main memory. Software components are generally stored in the nonvolatile memory within a file system adapted to the type of memory, such that they are locatable on the basis of their filename. Immediately after the booting of a software-controlled device, the microprocessor does not know the structure of the file system and therefore cannot access the file system, and so firstly it is necessary to load specific auxiliary software which configures the microprocessor for access to the file system of the nonvolatile memory.

The specific auxiliary software is first loaded by the firmware of a computer system from a defined memory area, the boot sector, of a bootable medium, and is executed. It is also referred to as a boot loader or boot program. The boot loader then loads further parts of the operating software.

The boot loader may be subdivided into a plurality of stages that build on one another, this then being a multistage boot loader. This subdivision into stages is effected e.g. if the program code of the boot loader is not fully accommodated in the boot sector of a boot medium. Initially only the first stage is then loaded and executed, and then the second stage, about which the first stage knows only the length, the block number and the identification of the medium, is loaded and executed. The second stage can now handle the concrete file system of the medium and loads the third stage e.g. on the basis of a filename. The third stage is now the actual boot loader, which loads e.g. a configuration file containing a selection menu, or software components required for the operation of the device, if appropriate in a predetermined sequence.

This multistage structure of the boot loader has a number of advantages; in this regard, in the case described above, the file of the actual boot loader that is to be loaded in the third stage can be arbitrarily changed or else shifted physically on the medium, since the second stage can already handle the file system of the medium and can find the third stage on the basis of the filename. In addition, such a boot loader is not subject to the limitations of the length of a boot block or boot sector.

Certain devices are subject to special requirements in respect of tamperproof operation, e.g. devices which control complex machines so that regulatorily approved and primarily safe operating points or areas are complied with, or machines which store or process data of high personal, commercial or social value.

As in almost every technological field, here as well attempts are repeatedly made to manipulate the software of such devices, whether it be to change the operating points or areas or to obtain access to data or other values.

In order to prevent attempts at manipulating the software, the devices may be configured to load only signed software components as early as during a booting operation. The signature of each respective software component is checked prior to execution, and a security component is configured during the booting operation, which security component is intended to recognize manipulations on software modules during the operation of the device and if necessary to configure countermeasures. This procedure is also referred to as a secure booting operation or "secure boot".

During a secure booting operation, e.g. a so-called message authentication code (MAC) can be used to obtain certainty about the origin of software components, data or messages and to check the integrity thereof.

MAC algorithms require two input parameters: the data to be protected and a secret key. Both are used to calculate a checksum, the message authentication code.

The integrity of a software component to be loaded during the booting operation can be checked by means of an MAC as follows: A secret key is stored in a secure memory or memory area of the device, and otherwise is known only to a software manufacturer authorized for the device. The software manufacturer calculates an MAC for this key and its software component. The software component and the associated MAC are stored in a nonvolatile memory of the device, from where they are read into a main memory and executed by a microprocessor as necessary. Before the software component is executed, a security function calculates the MAC for the software component stored in the nonvolatile memory using the key stored in the secure memory area of the device and compares the calculated MAC with the MAC stored for the software component. The security function interprets correspondence of both values as a successful integrity test, that is to say that it is assumed that the software component was provided by an authorized software manufacturer that knows the secret key, and it was not changed in the nonvolatile memory.

MACs are either based on block ciphers, on hash functions or are specially developed MACs. One conventional method for MAC calculation, the HMAC, is based on cryptographic hash functions and is used for example in SSL and IPsec communication methods. One widely used method based on block ciphers is the cipher-based message authentication code (CMAC) specified in the NIST Special Publication 800-38B, this code being used in conjunction with AES or triple DES cipher methods.

An attacker may then attempt to obtain knowledge of the secret key so that, if a symmetric key is used for the software verification, the attacker can generate a valid, authentic MAC for arbitrary software. The latter is then recognized as valid during the checking and is executed without hesitation.

Depending on the safeguarding of the keys, this may be very laborious for the attacker, and so often a different kind of attempt is made to infiltrate changed software or a changed software component into a system, in the case of which a valid signature is not generated for the changed software or changed software component.

For this purpose, in the case of devices configured for a secure booting operation, an attempt is made as early as during the booting operation, during which as yet not all security functions are ready and correctly parameterized, to bring about conditions which can make it possible to replace original software components with changed software components. These changed software components can then be used, for example, during the booting operation or during operation of the device, to grant an attacker access to operating parameters or access data, or the like, by means of which the actual aim of the attack is ultimately achieved.

Side channel attacks, for example, are used for this purpose. Side channel attacks comprise, inter alia, attacks which are directed at a system component that is apparently not connected with the regular execution of software components, or at a system parameter that is apparently not connected with the execution of software components, in order to cause the microprocessor to execute unauthorized program code. A side channel attack may comprise, inter alia, a manipulation of the clock frequency of the microprocessor, which puts the attacker in a position to be able to more easily manipulate address and data lines between the microprocessor and the nonvolatile memory, such that the microprocessor executes manipulated code or code from a different memory address than that actually provided, at which unauthorized code generated by the attacker is located.

During a CMAC-based secure booting operation, an attacker generally attempts, immediately after a successfully concluded CMAC verification of authentic software or an authentic software component and before the execution thereof, to change the last block of the software or software component, e.g. by direct access to interfaces of a memory or to the data lines which connect the memory to the processor. If an AES-based CMAC is used, for example, the attacker, after authentication has taken place, will change the last 128-bit block, which generally contains the program instructions to be executed last, in order to carry out an attack on the secure boot operation. In this case, by means of this change, the attacker will attempt to cause the processor to execute program code which has been provided in a different memory area by the attacker and which contains e.g. a user created by the attacker and the user's access data, or configures a communication connection via an interface that is not provided in the original software or software component. In the majority of attempts, the change will lead to a fault that ultimately triggers a reboot of the device. The attacker will therefore vary the changes in the last block of the software after each reboot until the device executes the program code in the different memory area, and the attacker obtains the desired access. Since the attack is not directed at accesses provided by the device during regular operation, rather an attempt is made in a different way to manipulate the device, in the present example by means of reducing the clock frequency and manipulating address and data lines, this type of attack is also referred to as a side channel attack.

Side channel attacks on a CMAC-based secure booting operation are accordingly distinguished, inter alia, by frequent changes in at least one block of software during the booting operation, a plurality of successive failed booting operations, a plurality of reboot attempts within a short time period after an operating time which falls below a predetermined minimum operating time even though the reboot was inherently carried out successfully, unusual resource allocations during the booting operation, and/or manipulation of the clock frequency before the booting operation. The manipulation of the clock frequency is primarily intended to serve to simplify external accesses to address and data lines.

Such attacks generally take place offline, i.e. locally, without there being a network connection of the attacked device via which the attack could be recognized, and so the owner or manufacturer of a device cannot obtain knowledge of the attacks and, consequently, cannot implement countermeasures either.

Particularly in the case of microprocessor-controlled devices having limited resources, i.e. small memory or low computing power, complex protective measures which could recognize side channel attacks cannot straightforwardly be implemented without at least the system performance being reduced by a no longer acceptable amount.

DE 102019127856 A1 discloses a method for secure booting of a control device. Said method comprises a hardware security module (HSM) and a host. After a voltage has been applied to the control device and after at least partial booting of the HSM, a check is made to establish whether a flag assigned to the HSM is set to a first value or a second value. If the flag is set to the second value, an integrity and authentication check of software assigned to the control device is carried out. If the flag is set to the first value, the boot operation of the HSM is completed by a request being communicated from the HSM to the host for booting of the host. If the integrity and authentication check is positive, the flag is set to the first value and a reboot of the HSM is initiated. A check is then made once again to establish whether the flag is set to the first value or the second value. The boot operation of the HSM is completed by a request being communicated from the HSM to the host for booting of the host if the flag is set to the first value.

U.S. Pat. No. 9,740,863 B2 discloses a device and a method for protecting a secure booting operation against side channel attacks. The device consists of hardware suitable for cryptography for a first booting operation. In addition, a nonvolatile memory for storing manipulated booting operations is provided. A comparison unit compares the number of manipulated booting operations against a maximum value. The comparison can be based on the read-out times of a first real-time clock and a second clock of the nonvolatile memory. On the basis of this comparison, a control logic transfers control from the first booting operation to a second booting operation.

DE 102019008059 A1 discloses a system and a method for minimizing the probability of the secret key used by a boot loader being compromised. A boot loader is installed on the device. The boot loader is a software program that carries out many functions. These functions may include checking the checksum of the incoming software image for integrity, decrypting the incoming software image using a secret key, deleting data in the FLASH memory, installing the new software image in the FLASH memory and other functions. The boot loader utilizes various techniques to track the versions of the software image to be installed. The method also counts the number of incomplete attempts that are made when trying to update the software image. By monitoring these parameters, the boot loader can determine when a malicious actor is attempting a side channel attack. In response, the boot loader may not allow a new software image to be loaded or the secret key to be accessed.

DE 102009000874 A1 describes a method and a system for improving the analyzability of software errors in a microcontroller. A monitoring module assigned to the microcomputer checks at least one function of the microcontroller and generates a signal if a malfunction of the microcontroller is recognized. The signal at least indirectly causes a reboot of the microcontroller. At least one software element that is executed during operation of the microcontroller is restarted during the reboot. During error-free operation of the microcontroller, at least one item of condition information is stored in a memory, wherein the condition information comprises at least the condition of an instruction counter and wherein the memory is not immediately overwritten or erased during a reboot. During the reboot or after the reboot has taken place, the items of condition information stored in the memory are accessed and the condition information for analyzing a software error is made available.

SUMMARY

It is therefore an object of the present invention to propose a method which recognizes different types of attacks without appreciably impairing the system performance and provides corresponding information for initiating or triggering countermeasures respectively adapted thereto.

This object is achieved by the method specified in claim 1. Advantageous embodiments and further developments are specified in the dependent claims.

The method according to the invention as described below for recognizing the type of an attack on a secure booting operation is preferably carried out in a separate monitoring component, which carries out the method in parallel with the actual boot process. Alternatively, the method can also be implemented as a separate process of a boot loader which, as part of firmware, is stored preferably so as to be unchangeable or only changeable concurrently with further security functions and is started first.

According to the invention, the method comprises as a first component, which is executed before a first authentication of software to be loaded or a software component to be loaded or before the checking of a hash value or a checksum over the last block of the software or software component and optionally further blocks, reading out at least one operating parameter from at least one system component necessary for the operation of the microprocessor, and comparing the at least one operating parameter read out with corresponding stored reference values. The at least one operating parameter can concern e.g. a supply voltage, provided by a power management unit, or a clock signal, provided by a clock generator, of the system or of the microprocessor and of further components. Associated reference values are preferably read out from a particularly secure memory area, and/or can be stored in a cryptographically secure manner. If the comparison shows a difference, a first signal, which signals a recognized side channel attack and a failed booting operation, is output, and the method and the further booting operation are ended or terminated. Otherwise, further components of the method are executed.

The method additionally comprises as a second component, which is likewise executed before a first authentication of software to be loaded or a software component to be loaded or before the checking of a hash value or a checksum over the last block of the software or software component and optionally further blocks, checking the state of a flag that is set during an as yet unsuccessfully concluded booting operation. If the flag is set, a second signal, which signals a recognized attack and a failed booting operation, is output and the method and the further booting operation are ended or terminated. If the flag was not set during the check, it is subsequently set and further components of the method are executed. Preferably, the flag is set in a nonvolatile memory, such that it retains its state for a relatively long time even without voltage supply. This component can be used, inter alia, for recognizing fault injection attacks, which often lead to a reset at a specific point before the end of the booting operation, e.g. on account of a signal of a watchdog, which after some time recognizes a booting operation that has stopped on account of an impermissible change in software or a software component, or on account of a so-called "hard" reset brought about by the attacker, i.e. a reset which is forced by the separation of the device from the power supply. Since the flag was not deleted, in contrast to when the booting operation is ended properly, it can be recognized during the subsequent booting operation.

The method additionally comprises as a third component calculating an authentication code of software to be loaded or a software component to be loaded, and, as a first checking step, comparing the calculated authentication code with the authentication code of the preceding booting operation read out from a memory. If the comparison shows a difference, a third signal, which signals a recognized fault injection attack and a failed booting operation, is output and the method and the further booting operation are ended or terminated. Otherwise, as a second checking step, the previously calculated authentication code is compared with a reference code read out from a memory, preferably a secure memory or memory area. If the comparison shows a difference, a fourth signal, which signals a recognized fault injection attack and a failed booting operation, is output and the method and the further booting operation are ended or terminated. If all components were executed without an attack being recognized and without the booting operation being terminated, the stored authentication code of the preceding booting operation is replaced with the authentication code calculated for the current booting operation, the flag that is set during an as yet unsuccessfully concluded booting operation is deleted, and the method is ended. Optionally, a signal which signals a secure booting operation having been carried out successfully can be output.

As an alternative to calculating an authentication code for comparison with a corresponding authentication code of a preceding booting operation, which under certain circumstances entails a not inconsiderable computational complexity, for the first checking step of the third component a hash value or a checksum, e.g. a CRC value, over the last block of the software or software component and optionally further blocks can be calculated and compared with a value for the same blocks stored during the previous booting operation. As a result, the complexity for the first checking step can be kept low, and the more complex calculation of the authentication code need only be implemented if no attack was ascertained in this first checking step. This affords an advantage particularly in the case of devices that are at risk of frequent attacks.

A general fault in the software or software component, e.g. on account of a memory error, will have identical hash values or checksums over a plurality of booting operations, while the hash values or checksums in the event of an attack will deviate from one another on account of the change generally in the last block during each booting operation.

If a multistage booting operation takes place, i.e. a plurality of programs or software components are loaded successively, the method can comprise a fourth component, which monitors a corresponding correct multiple execution of the third component. The fourth component comprises comparing a value assigned to a stage currently to be loaded with a reference value assigned to this stage. The value assigned to the stage currently to be loaded can be e.g. a part of a file that contains the program code, or can be locatable on the basis of the filename or other features in a table. The reference value for each stage of the secure booting operation or the table can be readable e.g. from a secure memory or memory area.

If the individual stages have to be processed successively in a specific order, a counter value can be stored in the software or software component of each stage, which counter value is compared with the present counter value. After the successful processing of the software or software component of a stage, the counter is incremented before the next stage is loaded, such that a new counter value is available for the comparison for the next stage. The counter is firstly reset in the event of the fourth component of the method being called, and the software or software component of the first stage correspondingly contains the value 0.

If the comparison shows a difference, a fifth signal, which signals a recognized fault injection attack and a failed booting operation, is output and the method and the further booting operation are ended or terminated. In this case, inter alia, the counter values allowing an identification of the affected software or software component can be provided for evaluating the type of attack and/or can be stored for a later improvement of security.

If the comparison shows no difference, the execution of the booting operation is continued and the fourth component will check the subsequent stages until the last stage of the booting operation indicated by the corresponding reference value has been loaded.

In one or more embodiments of the method, at the beginning and/or after successful conclusion of the booting operation, unique time information is stored, preferably in a secure memory or memory area and/or encrypted with a secret key stored in the device. For each new booting operation, preferably before the first authentication of software or a software component, present time information is compared with the stored time information. If the difference between the two items of time information is less than a predefined value or negative, a sixth signal, which signals a recognized attack and a failed booting operation, is output. The method is then ended and the further booting operation is terminated.

In an alternative embodiment, a plurality of points in time of successive rebooting operations are stored, and the number of rebooting operations within a predefined first time period is compared with a permissible maximum value. If the number of rebooting operations is above the permissible maximum value, a sixth signal, which signals a recognized attack and a failed booting operation, is output. The method is then ended and the further booting operation is terminated. This embodiment is suitable particularly if sufficiently accurate time information independent of the system is not immediately available at the beginning of the booting operation, but rather is only provided after system start-up has taken place, e.g. from an external time signal such as, for instance, GPS, NTP server, DCF-77 radio signal or the like. These embodiments make use of the insight that a large number of attacks are terminated unsuccessfully and repeated within a short time, in which case either a successfully concluded booting operation does not arise or the actual operating period after a successful booting operation is less than a previously defined "normal" minimum operating period.

The two embodiments above are well suited in particular to generating signals for the recognition of fault injection attacks, which generally require resource-intensive monitoring of the program execution. However, fault injection attacks are also distinguished by a series of specific events or features, inter alia the manipulation of the clock frequency, frequent rebooting operations of the first device after a cold boot, i.e. a boot after a relatively long time of no operation, or a so-called "hard" reset, or the repeated execution of the same software portion and interruptions of the entire verification chain during the actual boot operation, wherein only a specific stage of the boot operation is repeatedly executed and verified, and wherein a termination takes place upon unsuccessful verification. A hard reset can be recognized e.g. using the flag for an as yet unsuccessfully concluded boot operation. A further flag can be set by the software executed after a properly executed booting operation if said software triggers a reboot of the device, such that the reason for the reboot can be distinguished on the basis of the states of the two flags. In this case, if the device is properly shut down or put into a quiescent state, the flag can be deleted, for example, while previously it was set.

In one or more embodiments of the method in which unique time information is stored at the beginning and/or after successful conclusion of the booting operation, the beginning and/or successful conclusion of the booting operation are/is ascertained on the basis of a power consumption that is typical of these events, e.g. by way of corresponding data provided by a power management IC. The power consumption typically reaches a minimum between successive booting operations and then rises rapidly again.

In one or more embodiments of the method, the beginning of the booting operation is determined on the basis of a reset signal output by a microprocessor. Such reset signals are often used to boot further components of the first device which likewise need to be put into an operating state only during operation of the first device.

In one or more embodiments of the method, the allocation of at least one system resource of the first device is monitored during the booting operation, e.g. the frequency at which a processor cache is emptied and is allocated from scratch again to the same process and/or is written to from scratch for this process. The number of allocations of the same system resource to the same process within a predefined second time period is compared with a maximum value predefined for this system resource. If the number of allocations of the same system resource to the same process exceeds the predefined maximum value, a seventh signal, which signals a recognized attack and a failed booting operation, is output. In addition, the method is ended and the further booting operation is terminated. In this case, the term "process" may denote any desired software or software component, a thread or the like. This embodiment can particularly preferably be used in multiprocessor systems or systems with multicore processors, in which the method is carried out exclusively and securely on one of the processors or processor cores, but in this case can nevertheless more easily detect the accesses to processor-internal system resources.

In accordance with a further aspect of the invention, a device comprises one or more processors and also volatile and nonvolatile memories assigned thereto, which are communicatively connected to one another via one or more data lines or data buses. Computer program instructions are stored in the nonvolatile memory and, when they are executed by the at least one processor, configure the device to carry out one or more embodiments of the method according to the invention.

A computer program product in accordance with a further aspect of the invention contains instructions which, when executed by a microprocessor of a device, cause the latter to carry out one or more embodiments and further developments of the method described above.

The computer program product can be stored on a computer-readable medium or data carrier. The medium or the data carrier can be in a physical embodiment, for example as a hard disk, CD, DVD, flash memory or the like; however, the medium or the data carrier can also comprise a modulated electrical, electromagnetic or optical signal that can be received by a computer by means of an appropriate receiver and can be stored in the memory of the computer.

The method according to the invention makes it possible to recognize side channel or fault injection attacks on a secure booting operation with a lower burden on the system resources and system performance by comparison with traditional cryptographic methods. Particularly during time-critical booting operations of software or software components which have to be concluded within a specific maximum time, e.g. in a system context of a plurality of processes, running at least partly in parallel, of a system or of a plurality of devices which are communicatively connected to one another, it is advantageous to have the possibility of being able to recognize attacks at almost the same time during the booting operation, without the latter being appreciably delayed.

Accordingly, the method according to the invention can be advantageously used wherever a resource-conserving recognition of side channel or fault injection attacks on a secure booting operation is required, e.g. in the case of devices pertaining to the Internet of Things (IoT) or a distributed sensor infrastructure.

Preferably, the software or software component that implements the method is loaded early and before other software or other software components, ideally as part of the boot loader, such that the security functions are ready as quickly as possible. Alternatively or additionally, at least individual parts of the method can be executed by a dedicated fixed-programmed security processor.

BRIEF DESCRIPTION OF THE DRAWINGS

The invention will be explained in greater detail below with reference to the accompanying drawings.

Identical or similar elements may be referenced by the same reference signs in the figures.

DETAILED DESCRIPTION

Figure 1:
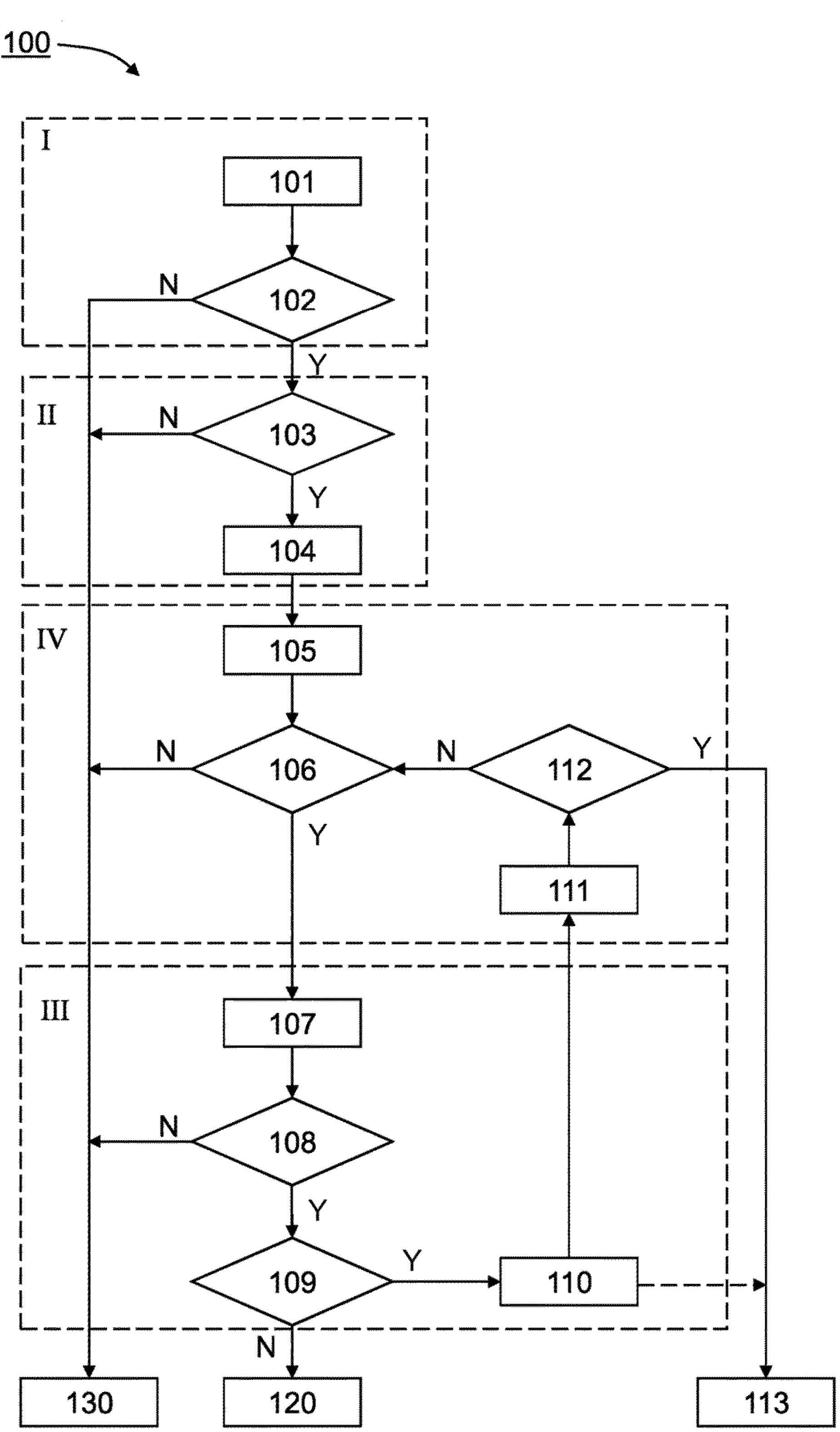
FIG. 1 shows a flow diagram of an exemplary method for recognizing a side channel attack on an AES-CMAC-based secure booting operation.

FIG. 1 shows a flow diagram of an exemplary method 100 for recognizing a side channel attack on an AES-CMAC-based secure booting operation of a microprocessor-controlled device 200. The aim here is to recognize a manipulation of the last 128-bit block of the booting operation. For the present example, it is assumed that a reset is executed upon each erroneous verification of the software. An AES-CMAC method is used when checking authenticity and integrity, the same key being used in each stage of the booting operation. Firstly, in a first component I, the presence of a side channel attack is checked. For this purpose, in step 101, at least one currently set operating parameter of at least one system component 208, e.g. a clock generating unit, of the device 200, said system component being necessary for operation of the microprocessor 202, is read out and, in step 102, is compared with corresponding reference values read out from a secure memory area 206*a*. If the comparison reveals that the currently set operating parameter(s) does (do) not correspond to the reference value(s), "N" branch of step 102, the method branches to step 130, in which a signal is output which signals that a side channel attack was recognized and that the secure booting operation has failed. In response to the signal, corresponding countermeasures can then be implemented.

If the comparison reveals that the currently set operating parameters correspond to the reference values, "Y" branch of step 102, the method branches to step 103 of a second component II, which step involves checking whether a flag "as yet unsuccessfully concluded booting operation" is deleted. If the flag is set, i.e. is not deleted, "N" branch of step 103, the method branches to step 130, in which a signal is output which signals that the previous booting operation was not correctly ended, that an attack is present, and that the secure booting operation has failed. In response to the signal, corresponding countermeasures can then in turn be implemented.

If the flag is deleted, i.e. not set, "Y" branch of step 103, it is set in step 104. The software provided for the secure booting operation or the corresponding software components can now be loaded, with further security checks taking place.

In step 105 of a fourth component IV, a counter for successfully performed stages of the present booting operation is reset and, in step 106, a check is made to establish whether the counter for the successfully performed stages of the booting operation corresponds to a reference value for the current stage. The reference value for each stage of the secure booting operation can be stored e.g. in a secure memory area. In this case, the software or software component of the stage can be identified e.g. on the basis of its filename or other features and can be compared with a correspondingly assigned reference value.

If the individual stages have to be processed successively in a specific order, e.g. a counter value can be stored in the software or software component of each stage, which counter value is compared with the present counter value. The software or software component of the first stage accordingly contains the value 0 since the counter was reset in step 105. Each software or software component of a stage increments the counter after successful processing, such that a new counter value is available for the comparison for the next stage.

Instead of incrementing a counter, after successful processing it is also possible for an arbitrary value to be written to a memory, which is read out by each stage, in which case the corresponding value of the preceding stage must then be programmed in each software or software component. This is possible particularly if all the stages are provided by a manufacturer that knows the values. This security function can recognize whether a stage of the secure booting operation was skipped or omitted.

Step 107 of a third component III carries out an authentication of the software or software component to be loaded in accordance with the respective implementation in the device; for example, on the basis of a secret key stored in the secure memory area, a CMAC for the software or software component to be loaded is calculated and stored and, in step 108, is compared with the likewise stored result of the authentication of the preceding secure booting operation. For the very first booting operation, optionally in a secure environment, the correct value for the preceding secure booting operation can be written to the memory, or an inapplicable error message and a termination of the booting operation can be suppressed in some other way. If the comparison reveals that the results of the two directly successive authentication operations deviate from one another, "N" branch of step 108, it can be assumed that a fault injection attack is present, which is typically associated with blocks of the software or software component that are changed during each booting operation, and a different MAC is therefore calculated during each booting operation, and that the secure booting operation has failed. The method correspondingly branches to step 130, in which a signal is output which signals that a fault injection attack is present and that the secure booting operation has failed.

If the comparison reveals that the results of the two directly successive authentication operations are identical, "Y" branch of step 108, in step 109 the result of the authentication is compared with a reference value, read out from a secure memory area, for the authentication of this software or software component. If the comparison reveals that the result of the authentication also corresponds to the reference value for the authentication, "Y" branch of step 109, in step 110 the result of the authentication from step 107 is stored as a new result of the authentication of the preceding secure booting operation. The previously stored result is overwritten in the process. By storing the most up-to-date result of the authenticity check in each case, it is possible for a fault injection attack to be quickly recognized in step 108. If the values of two successive booting operations are identical, but nevertheless do not correspond to the reference value, e.g. a memory error can be deduced. A change in the value to be stored between steps 109 and 110 would also be recognized in this way. In the subsequent step 111, the counter for the successfully performed stages of the booting operation is incremented and, in step 112, a check is made to establish whether the value of the incremented counter corresponds to the stored reference value of the final stage of the booting operation. In the positive case, "Y" branch of step 112, in step 113 the flag "unsuccessfully concluded booting operation" is deleted, and the secure booting operation is ended successfully.

If the comparison in step 109 reveals that the result of the authentication does not correspond to the reference value for the authentication, "N" branch of step 109, in step 120 the flag "unsuccessfully concluded booting operation" is deleted and a signal is output in response to which countermeasures, that are known to a person skilled in the art, for secure boot bypassing attacks can be initiated.

Figure 2:
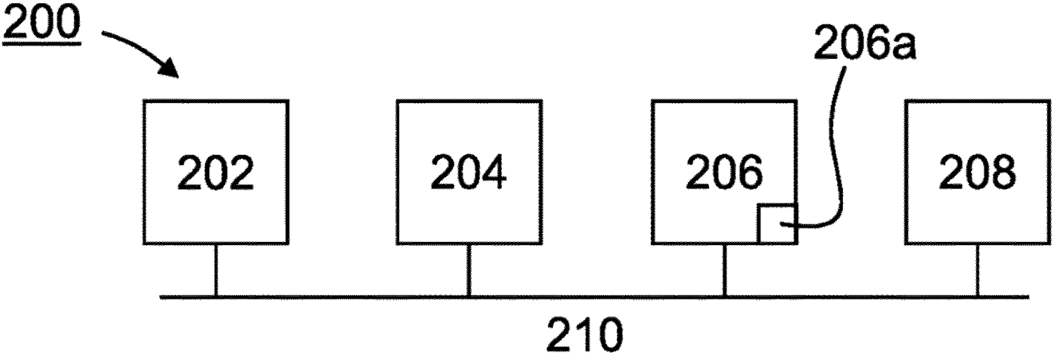
FIG. 2 shows an exemplary block diagram of a device configured to carry out one or more aspects of the method according to the invention.

FIG. 2 shows an exemplary block diagram of a device 200 configured to carry out one or more aspects of the method 100 according to the invention. The device 200 comprises, besides a microprocessor 202, volatile and nonvolatile memories 204, 206 and also at least one further system component necessary for operation of the microprocessor 202, e.g. a clock generator and/or a power management IC. The elements of the device 200 are communicatively connected to one another via one or more data lines or data buses 210. The nonvolatile memory 206 contains computer program instructions which, when they are executed by the microprocessor 202, configure the device to carry out one or more embodiments of the method according to the invention.

LIST OF REFERENCE SIGNS (PART OF THE DESCRIPTION)

100 Method
101 Reading out operating parameter of clock generating unit
102 Comparison with reference values of the operating parameters
103 Flag set?
104 Set flag
105 Reset counter for stages
106 Does the counter reading match the present stage of the booting operation?
107 Calculate authentication code/hash value/checksum
108 Does the authentication code/hash value/checksum match the preceding booting operation?
109 Comparing the authentication code/hash value/checksum with corresponding reference value
110 Store authentication code/hash value/checksum
111 Increment counter
112 Last stage reached?
113 Delete flag
120 Secure boot bypassing attack recognized, booting operation failed
130 Side channel attack recognized, booting operation failed
200 Device
202 Microprocessor
204 Volatile memory
206 Nonvolatile memory
**206*a*** Secure memory area
208 Further system component
210 Power line or data line/bus

The invention claimed is:

1. A method for recognizing a type of an attack on a secure booting operation of a microprocessor-controlled device, comprising:

reading out at least one operating parameter from at least one system component necessary for an operation of the microprocessor, and comparing the at least one operating parameter read out with corresponding stored reference values, wherein, if the comparison shows a difference, a first signal, which signals a recognized side channel attack and a failed booting operation, is output and the method is ended and the further booting operation is terminated, checking a state of a flag that is set during an as yet unsuccessfully concluded booting operation, wherein, if the flag is set, a second signal, which signals a recognized fault injection attack and a failed booting operation, is output and the method is ended and the further booting operation is terminated, wherein, if the flag is not set, the flag is set after the check, calculating a hash value or a checksum over at least one block of a software or software component, and comparing with a hash value or checksum stored for a same at least one block of the software or software component during a preceding booting operation, or calculating an authentication code of software to be loaded or a software component to be loaded, and comparing the calculated authentication code with the authentication code of the preceding booting operation read out from a memory, wherein, if the comparison shows a difference, a third signal, which signals a recognized attack and a failed booting operation, is output and the method is ended and the further booting operation is terminated, calculating, if not already done previously, an authentication code of software to be loaded or a software component to be loaded, and comparing the calculated authentication code with a reference code read out from a memory, wherein, if the comparison shows a difference, a fourth signal, which signals a recognized fault injection attack and a failed booting operation, is output and the method is ended and the further booting operation is terminated, replacing the authentication code of the preceding booting operation read out from the memory with the authentication code calculated for the current booting operation, and deleting the flag that is set during an as yet unsuccessfully concluded booting operation.

2. The method as claimed in claim 1, additionally comprising, if the booting operation is of multistage design:

comparing a current stage of a multistage booting operation with a reference value assigned to this stage, wherein, if the comparison shows a difference, a fifth signal, which signals a recognized fault injection attack and a failed booting operation, is output and the method is ended and the further booting operation is terminated, and wherein otherwise the execution of the booting operation and the loading of subsequent stages are continued until a last stage of the booting operation indicated by the corresponding reference value has been loaded.

3. The method as claimed in claim 1, additionally comprising:

storing unique time information at a beginning and/or after successful conclusion of the booting operation, comparing, for each new booting operation, present time information with a time information stored during a previous booting operation, wherein, if the comparison shows a difference which is less than a predefined value, a sixth signal, which signals a recognized attack and a failed booting operation, is output and the method is ended and the further booting operation is terminated.

4. The method as claimed in claim 1, additionally comprising:

storing unique time information at a beginning and/or after successful conclusion of the booting operation, comparing, for each new booting operation, a number of preceding rebooting operations within a predefined time with a permissible maximum value, wherein, if the number of preceding rebooting operations is above the permissible maximum value, a sixth signal, which signals a recognized attack and a failed booting operation, is output and the method is ended and the further booting operation is terminated.

5. The method as claimed in claim 4, wherein the beginning and/or the successful conclusion of a booting operation are/is ascertained on a basis of a power consumption that is typical of these events.

6. The method as claimed in claim 4, wherein the beginning of a booting operation is determined on a basis of a reset signal output by a microprocessor.

7. The method as claimed in claim 4, additionally comprising:

monitoring the allocation of at least one system resource of a first device during the booting operation, and comparing a number of allocations of a same system resource to a same process within a predetermined second time period with a maximum value predefined for this system resource, wherein, if the number of allocations of the same system resource to the same process exceeds the predefined maximum value, a seventh signal, which signals a recognized attack and a failed booting operation, is output and the method is ended and the further booting operation is terminated.

8. A device comprising at least one processor, volatile and nonvolatile memory and at least one further system component necessary for the operation of the microprocessor, which are communicatively connected to one another via one or more data lines or one or more data buses, wherein computer program instructions are retrievably stored in the nonvolatile memory and, when the instructions are executed by the at least one processor, configure the device to carry out a method comprising:

reading out at least one operating parameter from at least one system component necessary for an operation of the microprocessor, and comparing the at least one operating parameter read out with corresponding stored reference values, wherein, if the comparison shows a difference, a first signal, which signals a recognized side channel attack and a failed booting operation, is output and the method is ended and the further booting operation is terminated, checking a state of a flag that is set during an as yet unsuccessfully concluded booting operation, wherein, if the flag is set, a second signal, which signals a recognized fault injection attack and a failed booting operation, is output and the method is ended and the further booting operation is terminated, wherein, if the flag is not set, the flag is set after the check, calculating a hash value or a checksum over at least one block of a software or software component, and comparing with a hash value or checksum stored for a same at least one block of the software or software component during a preceding booting operation, or calculating an authentication code of software to be loaded or a software component to be loaded, and comparing the calculated authentication code with the authentication code of the preceding booting operation read out from a memory, wherein, if the comparison shows a difference, a third signal, which signals a recognized attack and a failed booting operation, is output and the method is ended and the further booting operation is terminated, calculating, if not already done previously, an authentication code of software to be loaded or a software component to be loaded, and comparing the calculated authentication code with a reference code read out from a memory, wherein, if the comparison shows a difference, a fourth signal, which signals a recognized fault injection attack and a failed booting operation, is output and the method is ended and the further booting operation is terminated, replacing the authentication code of the preceding booting operation read out from the memory with the authentication code calculated for the current booting operation, and deleting the flag that is set during an as yet unsuccessfully concluded booting operation.

9. The device of claim 8, wherein the method further comprises:

comparing a current stage of a multistage booting operation with a reference value assigned to this stage, wherein, if the comparison shows a difference, a fifth signal, which signals a recognized fault injection attack and a failed booting operation, is output and the method is ended and the further booting operation is terminated, and wherein otherwise the execution of the booting operation and the loading of subsequent stages are continued until a last stage of the booting operation indicated by the corresponding reference value has been loaded.

10. The device of claim 8, wherein the method further comprises:

storing unique time information at a beginning and/or after successful conclusion of the booting operation, comparing, for each new booting operation, present time information with a time information stored during a previous booting operation, wherein, if the comparison shows a difference which is less than a predefined value, a sixth signal, which signals a recognized attack and a failed booting operation, is output and the method is ended and the further booting operation is terminated.

11. The device of claim 8, wherein the method further comprises:

storing unique time information at a beginning and/or after successful conclusion of the booting operation, comparing, for each new booting operation, a number of preceding rebooting operations within a predefined time with a permissible maximum value, wherein, if the number of preceding rebooting operations is above the permissible maximum value, a sixth signal, which signals a recognized attack and a failed booting operation, is output and the method is ended and the further booting operation is terminated.

12. The device of claim 11, wherein the beginning and/or the successful conclusion of a booting operation are/is ascertained on a basis of a power consumption that is typical of these events.

13. The device of claim 11, wherein the beginning of a booting operation is determined on a basis of a reset signal output by a microprocessor.

14. The device of claim 11, wherein the method further comprises:

monitoring the allocation of at least one system resource of a first device during the booting operation, and comparing a number of allocations of a same system resource to a same process within a predetermined second time period with a maximum value predefined for this system resource, wherein, if the number of allocations of the same system resource to the same process exceeds the predefined maximum value, a seventh signal, which signals a recognized attack and a failed booting operation, is output and the method is ended and the further booting operation is terminated.

* * * * *